United States Patent [19]
Goode et al.

[11] Patent Number: 6,032,212
[45] Date of Patent: Feb. 29, 2000

[54] DEVICE AND METHOD FOR INTERFACING PCI AND VMEBUS WITH A BYTE SWAPPING CIRCUIT

[76] Inventors: Jeff Goode, 141 Lovvorn La., Huntsville, Ala. 35805; Stevens Robert, 128 Park Meadow Dr., Madison, Ala. 35758

[21] Appl. No.: 08/911,564

[22] Filed: Aug. 14, 1997

[51] Int. Cl.[7] .............................. G06F 12/10; G06F 13/00
[52] U.S. Cl. .......................... 710/129; 710/128; 710/100
[58] Field of Search ..................................... 395/500, 325, 395/309; 71/129, 128, 100, 106

[56] References Cited

U.S. PATENT DOCUMENTS

| | | | |
|---|---|---|---|
| 4,447,878 | 5/1984 | Kinnie et al. . | |
| 5,083,259 | 1/1992 | Maresh et al. | 395/325 |
| 5,255,374 | 10/1993 | Aldereguia et al. . | |
| 5,265,237 | 11/1993 | Tobias et al. | 395/500 |
| 5,313,231 | 5/1994 | Yin et al. | 345/199 |
| 5,335,340 | 8/1994 | Strong . | |
| 5,416,907 | 5/1995 | Polzin et al. . | |
| 5,428,763 | 6/1995 | Lawler . | |
| 5,522,050 | 5/1996 | Amimi et al. . | |
| 5,796,963 | 8/1998 | Odom | 395/308 |

OTHER PUBLICATIONS

Black, John, "A Few Words From the Editor Byte Ordering Problems: Don't Let Them Catch You by Surprise", VMEbus System, Mar.–Apr. 1987, pp. 31–36.

Morrisey, Shawn, "Byte Numbering Differences: VMEBus and the CPU–386", Force Computers, Inc., Technical Note, TN–001, Jan. 1987.

*Primary Examiner*—Ayaz R. Sheikh
*Assistant Examiner*—Tim Vo
*Attorney, Agent, or Firm*—Lanier, Ford, Shaver & Payne; Frank M. Caprio; Ann I. Dennen

[57] ABSTRACT

A byte-swapping circuit is provides for interfacing PCI systems to VMEbus systems. The circuit allows the PCI bus to selectively enable or disable byte swapping whether the VMEbus system is in master mode or slave mode. Also, the circuit delays the assertion of the DS0/DS1 VMEbus signals until after the byte swapping circuit has completed its operation, thus avoiding violations of the VMEbus timing specification. Finally, the circuit optimizes its performance during block transfer operations by maintaining its byte-swapping configuration constant during each bus cycle in a given block transfer. Thus, the circuit configures itself for the first bus cycle, but eliminates the reconfiguration delay for each bus cycle afterwards. The circuit can also byte-swap data bytes being transferred on the address bus during multiplexed block transfer cycles.

18 Claims, 10 Drawing Sheets

DEVICE AND METHOD FOR INTERFACING PCI AND VMEBUS WITH A BYTE SWAPPING CIRCUIT

BACKGROUND

Modem computer systems may be implemented with several different bus architectures. Two of the more common bus architectures today are PCI and VMEbus. The VMEbus specification is defined in the "VMEbus Specification Manual," which is incorporated herein by reference, as released by the VMEbus International Trade Association. The PCI bus specification is defined in PCI Local Bus Specification, Revision 2.1, which is incorporated herein by reference. The PCI bus specification is available from the PCI Special Interest Group, PO Box 14070, Portland, Oreg. 97214.

PCI is an evolution of the IBM PC/XT/AT architecture and was developed by Intel. PCI stores the most significant byte of a longword at the highest memory address allocated to store that longword, and stores the least significant byte at the lowest memory address. In the art, PCI is called a "little endian" architecture.

VMEbus is an evolution of the Motorola microprocessor architecture and was developed by Motorola, Signetics, Mostek, and Thompson CSF. Many VMEbus devices store the most significant byte of a longword at the lowest memory address, and store the least significant byte at the highest memory address. In the art, VMEbus is called a "big endian" architecture. Thus, the fundamental byte ordering schemes employed by "little endian" and "big endian" architectures differ, and these differences can easily cause problems when PCI and VMEbus must transfer multi-byte data units between themselves.

In more complex data processing systems, PCI systems may be networked with VMEbus systems. Thus, PCI and VMEbus may have to access common resources or transfer data between themselves. A serious compatibility issue arises when words, longwords, or other multi-byte data units must be passed between architectures that store those multi-byte data units differently.

The byte ordering issue surfaces when PCI and VMEbus access a common resource, such as a random access memory (RAM). For example, if PCI writes a longword to an allocated longword memory location in RAM, the most significant byte is stored at the highest memory address. However, if VMEbus attempts to read the longword from the same longword memory location, VMEbus expects the most significant byte to be at the lowest memory address. Thus, the two architectures conflict. Thus, when interfacing a "little endian" architecture, such as PCI, to a "big endian" architecture, such as VMEbus, it is necessary to employ additional circuitry to swap the order of the bytes appropriately as they pass between the architectures.

Adapter circuits such as the "Universe" chip, manufactured by TUNDRA Semiconductor Corporation of Kanata, Ontario, Canada, are available to interface PCI with VMEbus while providing a fixed byte-swapping mode. The Universe chip employs a fixed byte swapping circuit referred to as address invariant, which means that the byte addresses of individual bytes within a multiple byte transfer on PCI are maintained when accessing VMEbus. Thus, the Universe chip maintains the little endian mode even when the bytes are stored on VMEbus memory devices. The Universe chip does not provide a big endian mode whereby the VMEbus memory locations are treated as a big endian architecture. Accordingly, a need exists for a circuit that interfaces PCI to VMEbus while providing sophisticated and flexible byte-swapping capability.

U.S. Pat. No. 5,265,237, issued to Tobias et al., provides a byte-swapping apparatus for use with an AT computer and VMEbus. However, Tobias is somewhat unclear how its control system for enabling and disabling its byte-swapping circuitry operates. Further, Tobias fails to address the problems with byte swapping discussed below.

One shortcoming with existing byte swapping circuits is that they can cause VMEbus timing violations by failing to compensate for the delays inherent in byte-swapping the data bus. The VMEbus specification defines specific signals, called data strobes, that are asserted when the data bus contains stable data during a given bus cycle. On a write cycle, the DS0/DS1 signals serve as the data strobes. On a read cycle, the DTACK signal serves as the data strobe. Any de-stabilization of the data bus while the data strobe signals are asserted is a violation of the VMEbus timing specification.

Since the data path through the byte swapping logic inherently delays the data, the relationship between the data and the VMEbus data strobe signals can become skewed, with the VMEbus data strobe signal being asserted before the bytes are fully swapped. As the byte swapping is completed, the byte swapping circuit must drive the swapped bytes onto the data bus after the VMEbus data strobe signals have been asserted, thus causing a VMEbus timing violation. Accordingly, a need exists for a circuit providing byte-swapping capability while avoiding VMEbus timing violations.

Another problem with existing byte-swapping circuits is that they typically fail to optimize their performance during block transfer bus cycles, such as the BLT instruction defined by the VMEbus specification. As explained further below, the BLT instruction allows for multiple data transfers from successive addresses without the CPU updating the address bus for each transfer. Accordingly, a need exists for a byte-swapping circuit that optimizes its performance during block transfer bus cycles to maximize the throughput of the VMEbus interface.

SUMMARY

The instant invention provides a byte-swapping circuit that interfaces PCI to VMEbus systems while selectively disabling byte-swapping whether VMEbus is in the master mode or the slave mode. Thus, the instant invention provides an interface circuit offering sophisticated and flexible byte swapping capability. The instant invention includes a byte swapping circuit having at least two modes of operation: a first mode where some form of byte swapping takes place, and a second mode where no byte swapping takes place. The invention also includes a VME control interface for controlling the byte swapping circuit. The VME control interface decodes several control signals from VMEbus, and configures the byte-swapping circuit to swap in the appropriate mode. The invention also provides a PCI control register for selectively enabling or disabling byte-swapping.

The instant invention addresses the VMEbus timing violation problem by providing circuitry that delays the assertion of the DS0/DS1 data strobe signals on a master mode write cycle, and delays the assertion of the DTACK data strobe signal on a master mode read cycle. This delay allows the byte swapping circuit to complete byte swapping before the DS0/DS1 or DTACK signals are asserted. Once the byte-swapping is complete and the swapped bytes are driven onto the data bus, the DS0/DS1 or DTACK signals are asserted, only then indicating that stable, swapped bytes are present on the data bus and are ready for latching. Thus, the instant invention avoids violating the VMEbus timing specification.

The instant invention also optimizes the performance of the VMEbus interface during block transfers. The delayed assertion of DS0/DS1 or DTACK has the side effect of reducing the overall throughput of the VMEbus interface, since other devices must wait longer for DS0/DS1 or DTACK to be asserted before they can latch the data bus. Two causes contribute cumulatively to this delay. The first cause is the time required for the byte swapping circuit to configure the byte swapper. The second cause is the gate propagation delay inherent in the circuitry comprising the byte swapping circuit. The instant invention addresses this first cause of delay by optimizing the byte swapping circuit to avoid that delay during BLT bus cycles.

The VMEbus specification defines several block transfer modes. During a block transfer, VMEbus executes several individual bus cycles that transfer bytes from successively ascending addresses. A master device initiates the block transfer by asserting the starting address of the block of data to be transferred and specifying the word size of the data to be transferred. A selected slave device then latches this starting address, and begins transferring the several bytes of data. Typically, this block transfer takes several bus cycles to complete. During these several bus cycles, the master is not required to update the address bus to store the ascending addresses of the transferred bytes. Instead, the slave must retrieve successive bytes of data from those ascending addresses without the address bus being explicitly supplied by the master.

The salient feature of a block transfer is that the VMEbus control signals necessary to configure the byte swapping circuit remain constant throughout all of the individual bus cycles that comprise the block transfer. During bus operations other than block transfers, the status of those control signals typically changes for each consecutive bus cycle, and typically the byte-swapping circuit is re-configured for each consecutive bus cycle according to those changing control signals. However, during a block transfer, these control signals do not change during the several bus cycles that comprise the block transfer. Thus, there is no need to re-configure the byte-swapping circuit for each bus cycle in the VMEbus block transfer, and the delay caused by that re-configuration can be eliminated.

The instant invention takes full advantage of the VMEbus block transfer mode by configuring the byte-swapping circuit for the first bus cycle in the block transfer, and by maintaining that configuration constant for each subsequent bus cycle in the block transfer. Thus, the invention avoids the delay in decoding the control signals and re-configuring the byte-swapping circuit for each subsequent bus cycle, realizing a substantial improvement in interface performance during VMEbus block transfers.

The invention supports both 32-bit and 64-bit block transfers. During 64-bit VME block transfers (also called MBLT transfers), the address bus bits A31–A1 and the LWORD signal carry "data" to form the 64-bit data width. A31–A1 plus LWORD combined with data bus signals D31–D0 form a temporary 64-bit data bus. The invention supports byte swapping during an MBLT and therefore must support swapping of the address bus, which temporarily transfers "data" during the MBLT.

During an MBLT, the address bus carries address information during the first cycle of the MBLT transfer. This is called an address broadcast transfer. During the address broadcast, data is not transferred on the D31–D0 data bus. During the second cycle, and all subsequent cycles, of the MBLT transfer, both the address bus and the data bus become active and carry "data". During this transaction the data bus and address bus will be either swapped or not swapped, depending on the status of the master and slave big endian bits.

DETAILED DESCRIPTION OF THE PREFERRED EMBODIMENT

The invention will now be described in detail with reference to the attached drawings.

Figure 1:
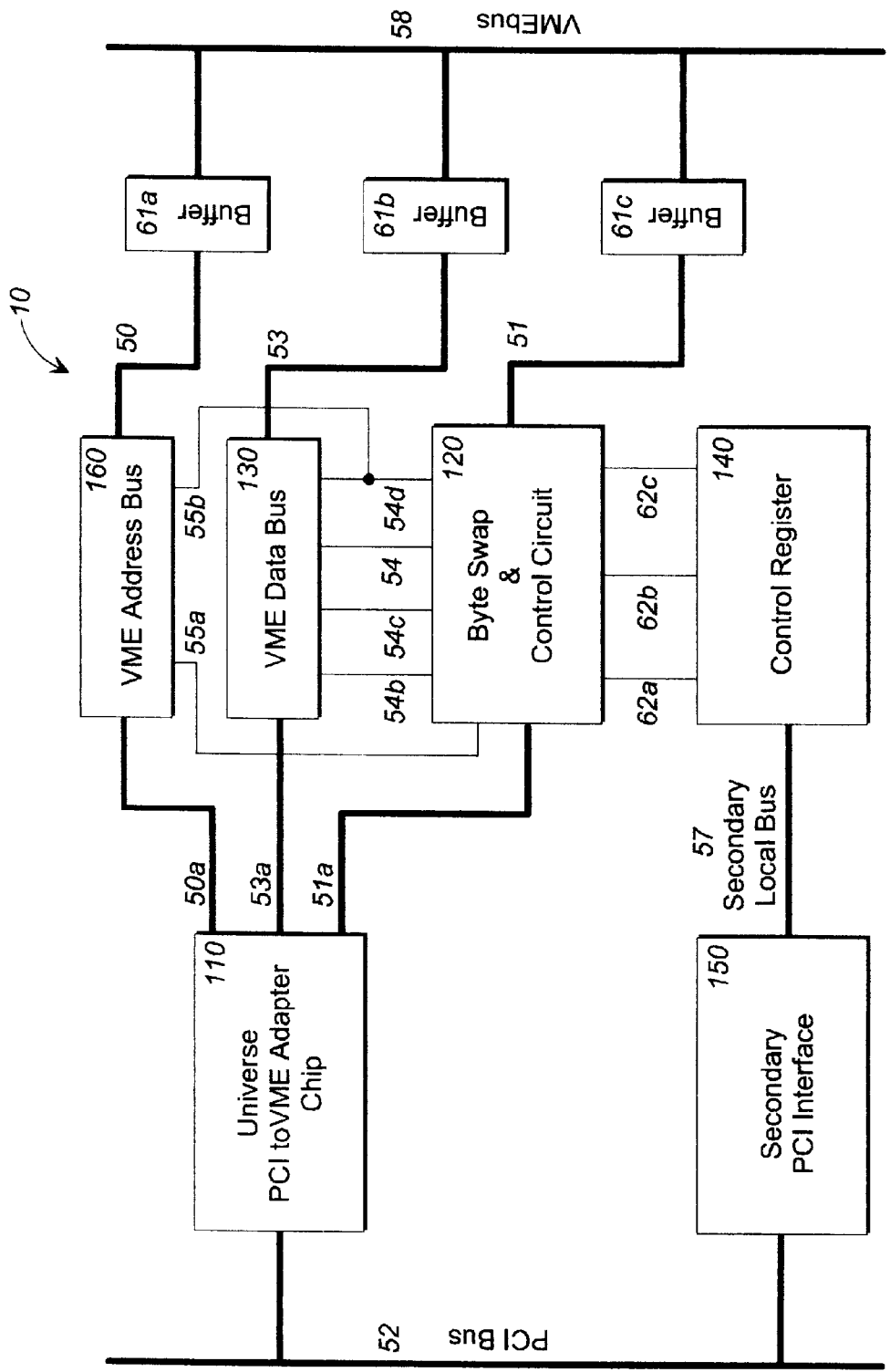
FIG. 1 is a block diagram of the circuit components of the invention.

FIG. 1 is a block diagram of interface circuit 10, which interfaces VME bus 58 to PCI bus 52.

VME bus 58 is defined in the "VMEbus Specification Manual," which is incorporated herein by reference, as released by the VMEbus International Trade Association. VME address bus 50, VME control bus 51, and VME data bus 53 comprise VMEbus 58. As stated above, VME bus 58 is a "big endian" architecture, which means that the most significant byte of a word is stored at the lowest memory address allocated to store that word.

PCI bus 52 is defined in the PCI Local Bus Specification, revision 2.1, which is incorporated herein by reference. As discussed earlier, PCI bus 52 is a "little endian" architecture, which means that the most significant byte of a word is stored at the highest memory address allocated to store that word.

Interface circuit 10 includes adapter chip 110, secondary PCI interface 150, byte swap control circuit 120, PCI control register 140, data bus swap circuit 130, address bus swap circuit 160, and buffers 61a, 61b, and 61c. One exemplary adapter chip 110 is the Universe chip manufactured by the TUNDRA Semiconductor Corporation of Kanata, Ontario, Canada.

Figure 2:
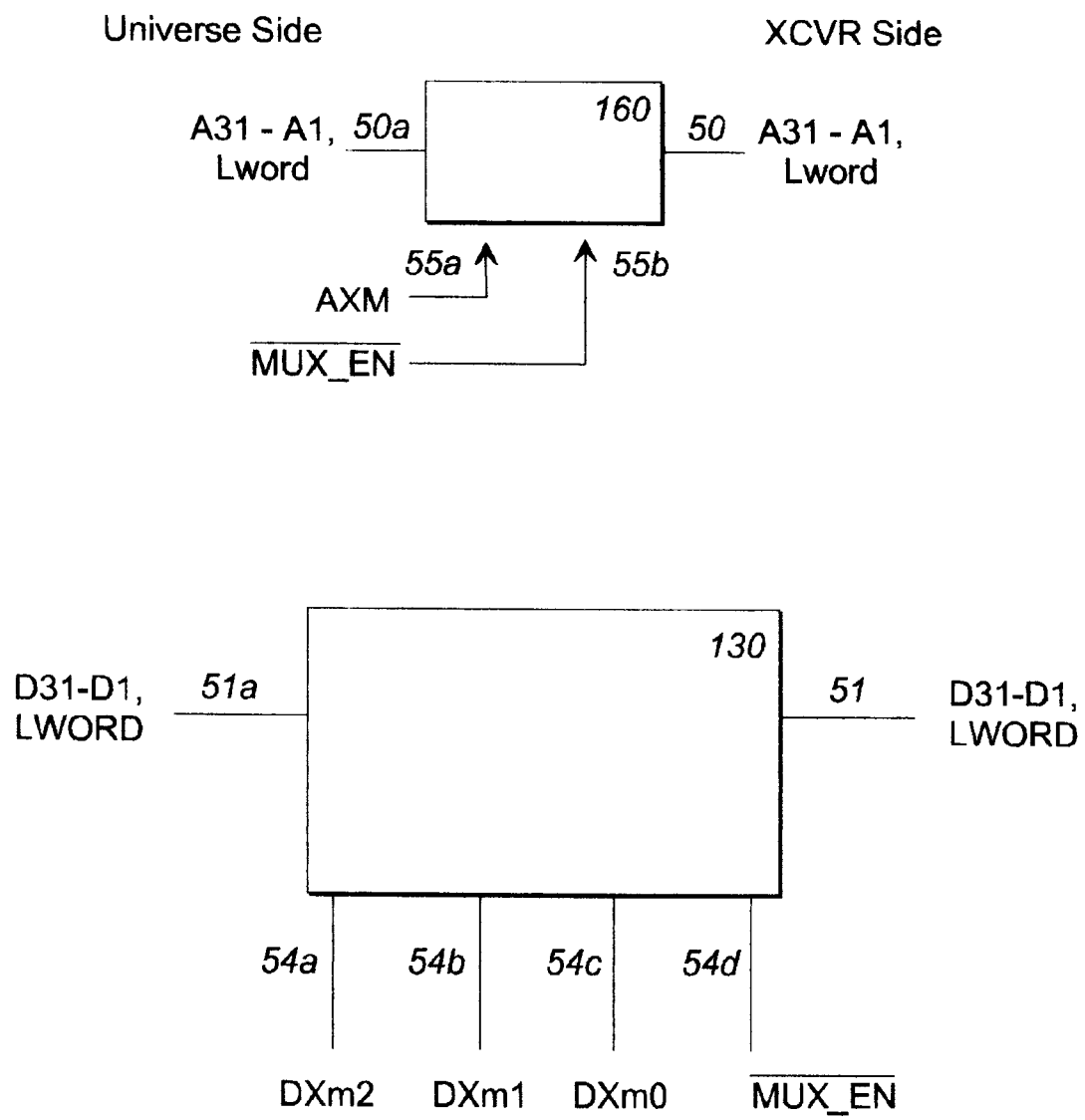
FIG. 2 is a block diagram of the data bus swap circuit and the address bus swap circuit.
Figure 3:
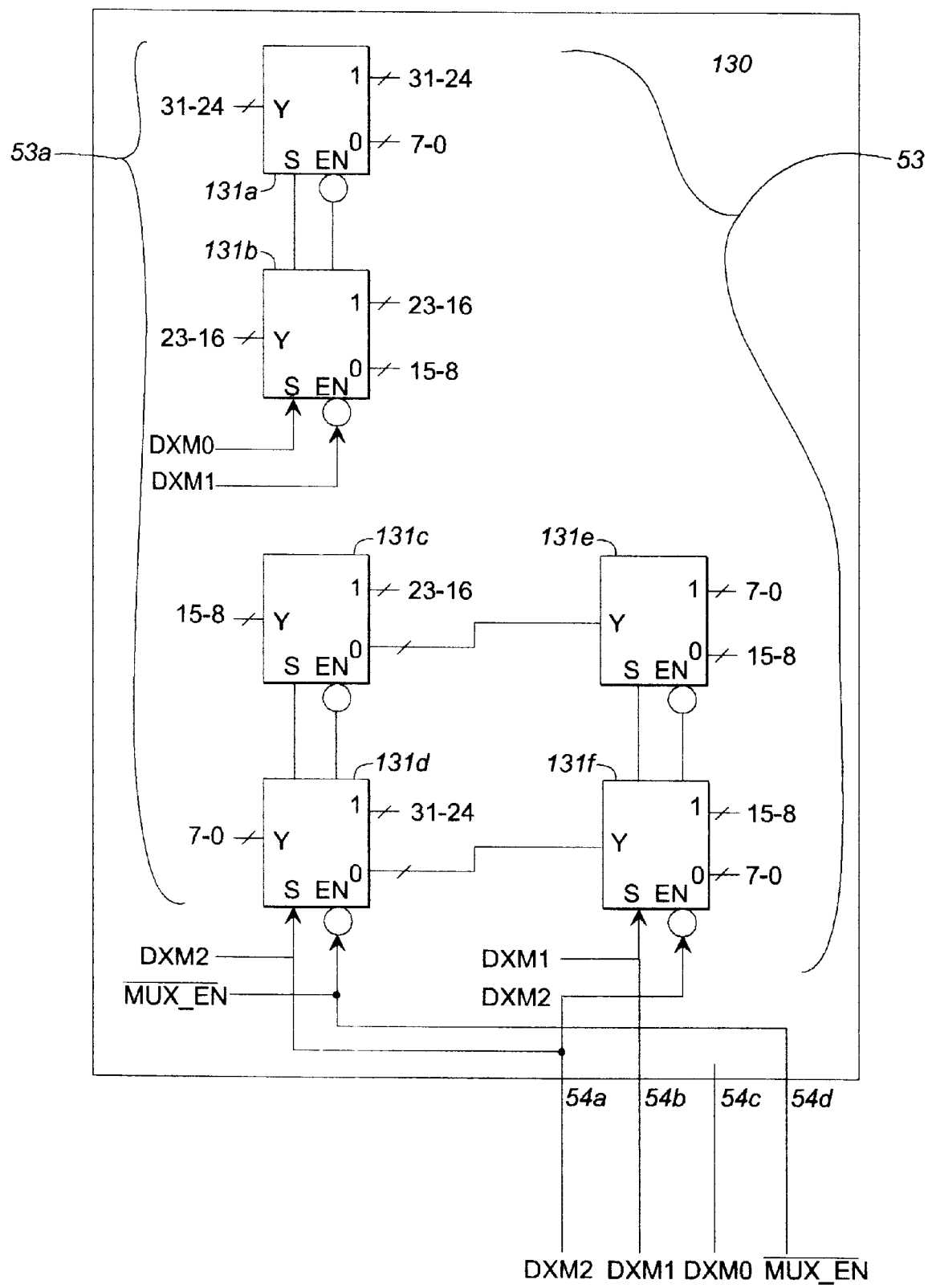
FIG. 3 is a schematic diagram of the logic comprising the data bus swap circuit.

Data bus swap circuit 130 swaps the order of the data bytes passing between PCI bus 52 and VME bus 58 to avoid data corruption due the different byte ordering schemes employed by the two architectures. The signals passed to data bus swap circuit 130 are illustrated in FIG. 2, and is described in detail below. The circuitry comprising data bus swap circuit 130 is illustrated in FIG. 3, and is described in further detail below. Data bus swap circuit 130 is connected to VME data buses 51 and 51a. Bytes traveling to/from VME bus 58 on VME data bus 51 will be ordered in "big endian" fashion, while bytes traveling to/from PCI bus 52 on VME data bus 51a will be ordered in "little endian" fashion.

Data bus swap circuit 130 is operable in a plurality of selectable modes, and the swapping mode is determined by the status of four control signals 54a, 54b, 54c, and 54d received from control circuit 120. Control circuit 120 thus controls the mode of byte swapping performed by data bus swap circuit 130. Depending on the status of these four control signals, data bus swap circuit 130 is configured to swap the bytes passing between VME data buses 51 and 51a appropriately.

These four control signals are, respectively, the DXM2, DXM1,DXM0, and MUX_EN* control signals defined by byte swap control circuit 120.

Control register 140 includes three flip-flops, one each corresponding to signals 62a, 62b, and 62c. Control register 140 is connected to byte swap control circuit 120 by three signals 62a, 62b, and 62c. Signals 62a–62c allow control register 140 selectively to enable or disable byte swapping through byte swap control circuit 120. Signal 62a controls endian conversion when byte swap control circuit 120 is mastering on VMEbus 58. If signal 62a is set, byte swap control circuit 120 operates in big endian mode. If the bit is clear, byte swap control circuit 120 operates in little endian mode. Signal 62b controls endian conversion when byte swap control circuit 120 is a slave on VMEbus. If the bit is set, byte swap control circuit 120 operates in big endian mode. If the bit is clear, byte swap control circuit 120 operates in little endian mode. Signal 62c is used by software to enable the byte swap multiplexors after power-on. As discussed further below, control signals 62a–62c correspond to the SYS_REG[0], SYS_REG[1], and SYS_REG [11] signals.

Figure 5:
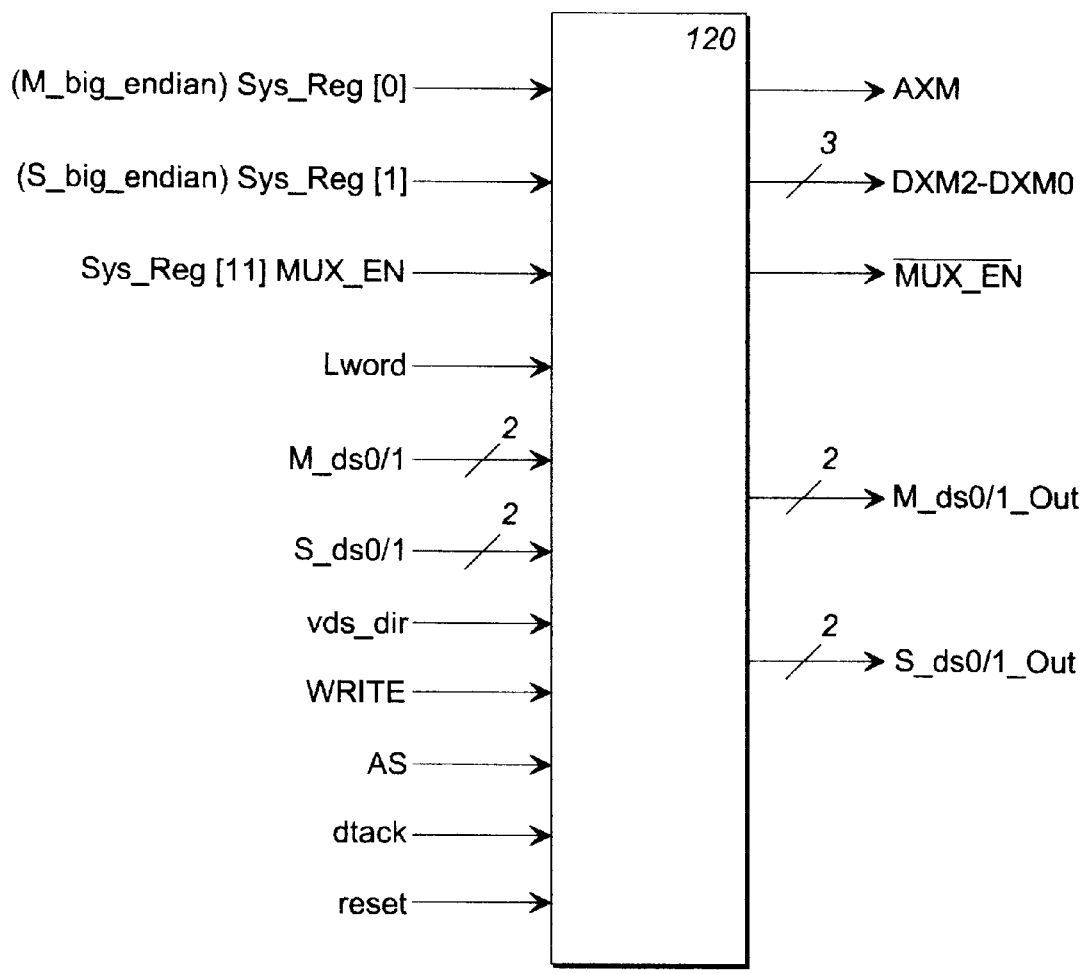
FIG. 5 is a block diagram of the byte swap control circuit.

Byte swap control circuit 120 communicates with VME bus 58 through VME control bus 53 and with PCI bus 52 through VME control bus 53a. Byte swap control circuit 120 extracts four control signals from VME control buses 53 and 53a, and passes those control signals to data bus swap circuit 130 as control signals 54a–54d. The circuitry comprising byte swap control circuit 120 is illustrated in FIG. 5, and is described in detail below.

VME bus 58 is connected to three buffer banks 61a, 61b, and 61c, which connect to VME address bus 50, VME data bus 51, and VME control bus 53, respectively. VME address bus 50 is routed through address byte swap circuit 160 to adapter chip 110, VME data bus 51 is routed through data bus swap circuit 130 to adapter chip I 10; and VME control bus 53 is routed through byte swap control circuit 120 to adapter chip 110.

PCI bus 52 communicates with adapter chip 110, and with secondary PCI interface 150. Secondary PCI interface 150 is preferably the PCI 9060ES chip sold by PLX Technology, Inc. of Sunnyvale, Calif. 94086. Secondary PCI interface 150 produces a secondary local bus 57 that connects to PCI control register 140.

FIG. 2 is a block diagram of address bus swap circuit 160 and data bus swap circuit 130. Address buses 50 and 50a pass through address bus swap circuit 160, while data buses 51 and 51a pass through data bus swap circuit 130. The operation of address bus swap circuit 160 is controlled by control signals 55a and 55b, which correspond to the AXM and MUX_EN* control signals, respectively, driven by byte swap control circuit 120. The operation of data bus swap circuit 130 is controlled by control signals 54a, 54b, 54c, and 54d, which correspond to the DXM2, DXM1, DXM0, and MUX_EN* control signals, respectively, driven by byte swap control circuit 120. It will be noted that MUX_EN* controls both address bus swap circuit 160 and data bus swap circuit 130. The circuitry comprising address bus swap circuit 160 and data bus swap circuit 130, and the logic defining the various control signals, will be described in detail below.

FIG. 3 is a schematic diagram of data bus swap circuit 130. Data buses 53a and 53 flow into opposite sides of data bus swap circuit, and connect to a plurality of 1×2 multiplexers 131. The high-order byte of data bus 53a, D31–D24, is joined to multiplexer 131a. D23–D16 of data bus 53a are joined to multiplexer 131b, D15–D8 are joined to multiplexer 131c, and D7–D0 are joined to multiplexer 131d. Multiplexer 131a–131d should be understood to comprise eight individual multiplexers operating under common control, with one each of the eight multiplexers being connected to one each of the data bus signals. To simplify FIG. 3, the eight multiplexer are shown as one multiplexer.

Multiplexors 131a–131e each include a select input designated S, an enable input designated EN, a common terminal designated Y, and two selectable terminals designated 1 and 0. When an active signal is applied to EN, the logic comprising the multiplexer examines the signal present at S. If S=1, then the multiplexer connects terminal Y to selectable terminal 1. If S=0, then the multiplexer connects terminal Y to selectable terminal 0.

Multiplexer 131a and 131b are controlled by the DXM0 signal 54c connected to their S terminals and by the inverted DXM1 signal 54b connected to their EN terminals. Data bus 53 is joined to multiplexers 131a–131 d. The high order byte, D31–D24, of data bus 53 is joined to the selectable terminal 1 of multiplexer 131a, while the low order byte, D7–D0, is joined to selectable terminal 0 of multiplexer 131a. Likewise, D23–D16 of data bus 53 are joined to selectable terminal 1 of multiplexer 131b, while D15–D8 are joined to selectable terminal 0. Thus, multiplexer 131a can selectively connect D31–D24 of data bus 53a to D31–D24 of data bus 53, providing a pass-through, no byte-swapping mode. Alternatively, multiplexer 131a can connect D31–D24 of data bus 53a to D7–D0 of data bus 53, thus swapping the high-order byte of data bus 53a to the low-order byte of data bus 53. The same principles apply to multiplexer 131b.

Multiplexer 131c and 131d are controlled by the DXM2 control signal 54a connected to their S terminals, and by the inverted MUX_EN signal connected to their EN terminals. D15–D8 of data bus 53a are connected to the Y terminals of multiplexer 131c, while selectable terminals 1 of multiplexer 131c are connected to D23–D16 of data bus 53.

D7–D0 of data bus 53a are connected to the Y terminals of multiplexer 131d, while selectable terminals 1 of multiplexer 131d are connected to D31–D24 of data bus 53.

Multiplexer 131e and 131f are controlled by the DXM1 signal 54b connected to their S terminals, and by the inverted DXM2 signal 54a connected to their EN terminals. The Y terminal of multiplexer 131e is connected to selectable terminal 0 of multiplexer 131c, while the Y terminal of multiplexer 131f is connected to selectable terminal 0 of multiplexer 131d. The selectable terminal 1 of multiplexer 131e is connected to D7–D0 of data bus 53, wile the selectable terminal 0 of multiplexer 131e is connected to D15–D8. The selectable terminal 1 of multiplexer 131f is connected to D15–D8 of data bus 53, wile the selectable terminal 0 of multiplexer 131f is connected to D7–D0.

Thus, multiplexer 131c can connect D15–D8 of data bus 53a with either D23–D16, D7–D0, or D15–D8 of data bus 53, effectively providing a sophisticated byte swapping capability. Similarly, multiplexer 131d can connect D7–D0 of data bus 53a with either D31–D24, D7–D0, or D15–D8 of data bus 53.

The rules relating the status of control signals DXM0, DXM1, and DXM2 to the appropriate byte swapping mode are given in Table 1. The first column of Table 1 lists the four bytes of data bus 53a. The second, third, and fourth columns specify how those four bytes of data bus 53a are mapped onto data bus 53, given the status of the control signals DXM0, DXM1, and DXM2.

TABLE 1

| Adapter chip 110 | DXM2 = 0<br>DXM1 = 0<br>DXM0 = 1 | DXM2 = 1<br>DXM1 = 0<br>DXM0 = 0 | DXM2 = 0<br>DXM1 = 1<br>DXM0 = X |
| --- | --- | --- | --- |
| D31–D24 | D31–D24 | D7–D0 | |
| D23–D16 | D23–D16 | D15–D8 | |
| D15–D8 | D15–D8 | D23–D16 | D7–D0 |
| D7–D0 | D7–D0 | D31–D24 | D15–D8 |

MUX_EN* = 0, after reset.

Figure 4:
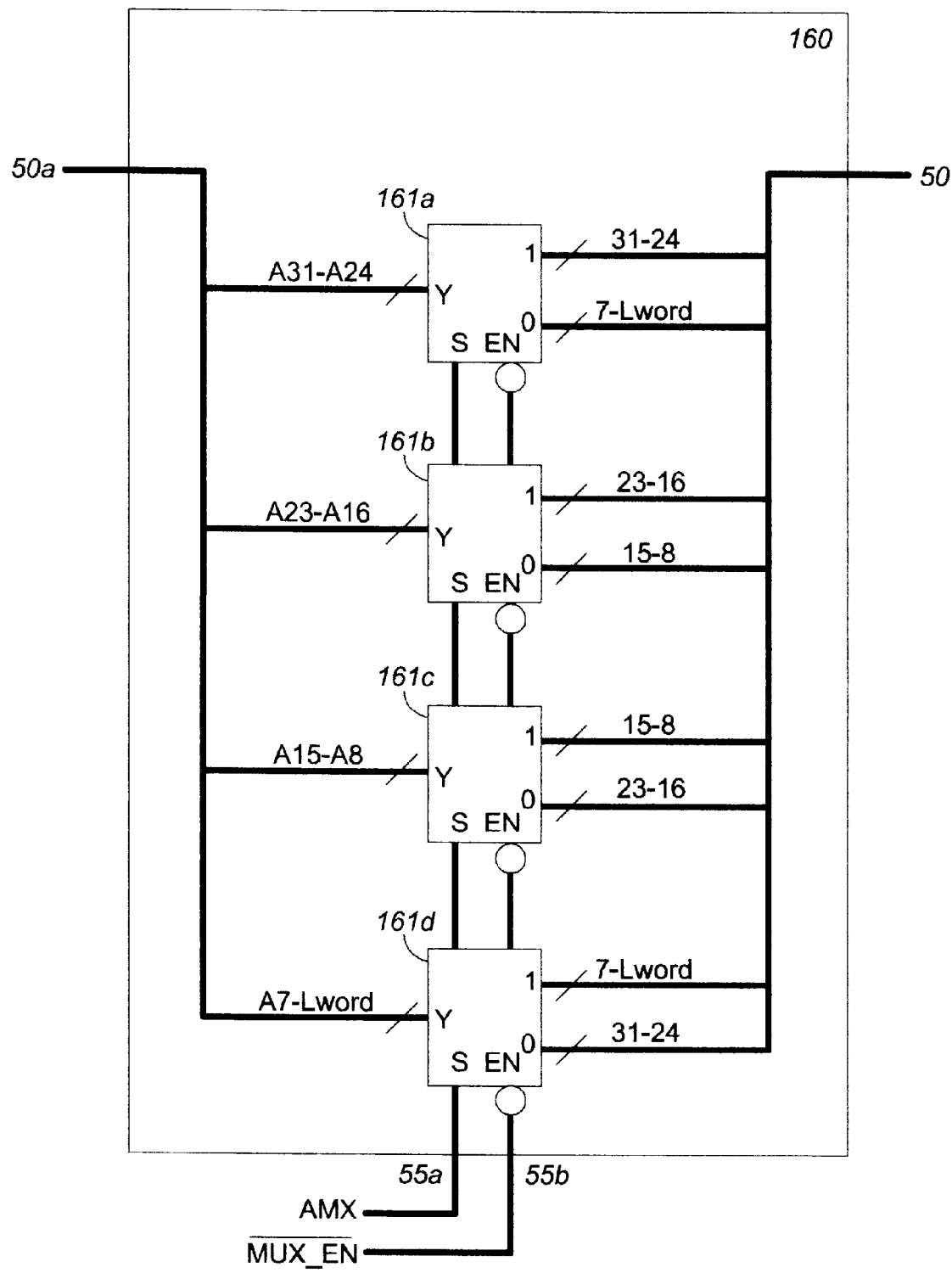
FIG. 4 is a schematic diagram of the logic comprising the address bus swap circuit.

FIG. 4 is a schematic diagram of address bus swap circuit 160. Address buses 50a and 50 connect to address bus swap circuit 160. Address bus swap circuit includes four multiplexers 161a, 161b, 161c, and 161d. However, like FIG. 3, each of the four multiplexers 161a–161d should be understood to represent eight parallel 1×2 multiplexers operating under common control. Each of the multiplexers 161a–161d are controlled by the AXM control signal 55a and the MUX_EN* control signal 55b driven by byte swap control circuit 120. Each of the multiplexers 161a–161d have their S terminal connected to AXM control signal 55a, and their EN terminals connected to the inverted MUX_EN* control signal 55b.

The Y terminals of multiplexer 161 a are connected to A31–A24 of address bus 50a, while the selectable terminal 1 is connected to A31–A24 of address bus 50, and the selectable terminal 0 is connected to A7-LWORD. The Y terminals of multiplexer 161b are connected to A23–A16 of address bus 50a, while the selectable terminal 1 is connected to A23–A16 of address bus 50, and the selectable terminal 0 is connected to A15–A8. The Y terminals of multiplexer 161c are connected to A15–A8 of address bus 50a, while the selectable terminal 1 is connected to A15–A8 of address bus 50, and the selectable terminal 0 is connected to A23–A16. The Y terminals of multiplexer 161d are connected to A7-LWORD of address bus 50a, while the selectable terminal 1 is connected to A7–LWORD of address bus 50, and the selectable terminal 0 is connected to A31–A24. As described in FIG. 3, multiplexers 161a–161d can connect selected bytes of address bus 50a to selected bytes of address bus 50, thus providing a sophisticated capability by swap the bytes comprising address buses 50a and 50.

The rules relating the status of control signal AXM to the appropriate byte swapping mode are given in Table 2. The first column of Table 2 lists the four bytes of address bus 50a. The second and third columns specify how those four bytes of address bus 50a are mapped onto address bus 50, given the status of the control signal AXM.

TABLE 2

| Adapter chip 110 | AXM = 1 | AXM = 0 |
| --- | --- | --- |
| A31–A24 | A31–A24 | A7–A1, LWORD |
| A23–A16 | A23–A16 | A15–A8 |
| A15–A8 | A15–A8 | A23–A16 |
| A7–A1, LWORD | A7–A1, LWORD | A31–A24 |

AXM = 1, for little endian mode and for first transfer in MBLT mode "address broadcast".
AXM = 0, for big endian mode for second transfer.
MUX_EN* = 0, after reset.

FIG. 5 is a block diagram of the inputs to and outputs from byte swap control circuit 120. Inputs to byte swap control circuit 120 are SYS_REG[0], SYS_REG[1], MUX_EN, LWORD, M_DS0, M_DS1, S_DS0, S_DS1, VDS_DIR, AS, DTACK, and RESET. Outputs from byte swap control circuit 120 are AXM, DXM2, DXM1, DXM0, MUX_EN*, M_DS0_OUT, M_DS1_OUT, and S_DS0_OUT, S_DS1_OUT.

Byte swap control circuit 120 takes the following signals as input:

1. SYS_REG[0] is also referred to as the master big_endian bit. This bit controls endian conversion when byte swap control circuit 120 is mastering on VMEbus 58. If SYS_REG[0] is set, then byte swap control circuit 120 operates in big endian mode. If the bit is clear, then byte swap control circuit 120 operates in little endian mode.
2. SYS_REG[1] is also referred to as the slave big_endian bit. This bit controls endian conversion when byte swap control circuit 120 is a slave on VMEbus 58. If SYS_REG[1] is set, then byte swap control circuit 120 operates in big endian mode. If the bit is clear, then byte swap control circuit 120 operates in little endian mode.
3. SYS_REG[11] is also referred to as MUX_EN (mux enable). MUX_EN is used by software to enable the byte swap multiplexors after power-on. Byte swap control circuit 120 inverts MUX_EN to produce an active-low MUX_EN* signal, which is driven to data bus swap circuit 130 and address bus swap circuit 160.
4. LWORD is the longword control signal defined by the VMEbus specification.
5. M_DS0 and M_DS1 are versions of the DS0 and DS1 VMEbus signals driven by adapter chip 110.
6. S_DS0 and S_DS1 are versions of the DS0 and DS1 VMEbus signals received by adapter chip 110.
7. VDS_DIR is a direction signal driven the adapter chip 110.
8. AS is the address strobe signal as defined by the VMEbus specification.
9. DTACK is the data acknowledge signal as defined by the VMEbus specification.
10. RESET is the local power-on reset signal. Byte swap control circuit 120 generates as output the following signals:
1. AXM controls byte swapping for address bus swap circuit 160.

2. DXM2–DXM0 control byte swapping for data bus swap circuit 130.

3. MUX_EN* is an inverted version of SYS_REG[11] input and is used to enable the swap multiplexors of address bus swap circuit 160 and data bus block circuit 130 after power on.

Figure 6:
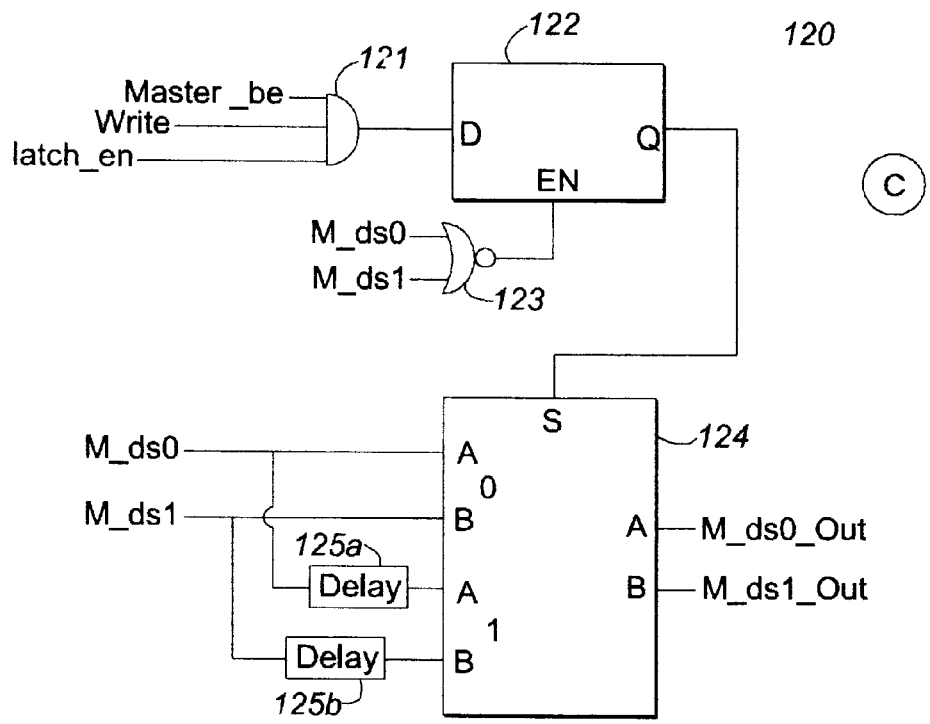
FIG. 6 is a schematic diagram of the circuit defining the data strobe signals when the PCI bus is in master mode.

FIG. 6 is a schematic diagram of the logic in byte swap control circuit 120 that defines the M_DS0_OUT and the M_DS1_OUT signals, which are versions of the M_DS0 and M_DS1 data strobe signals taken as input. The circuit in FIG. 6 is enables when byte swap control circuit 120 is mastering on VMEbus 58. Byte swap control circuit 120 can produce M_DS0_OUT and M_DS1_OUT signals that are either delayed or non-delayed relative to the M_DS0 and M_DS1 data strobe signals. During single cycle transfers (those cycles that are neither block transfer cycles nor multiplexed block transfer cycles), the M_DS0_OUT and M_DS1_OUT data strobes are always delayed relative to the input M_DS0 and M_DS1 data strobes. This is true whether byte swap control circuit 120 is a master or a slave on VMEbus 58.

For BLT and MBLT operations, M_DS0_OUT and M_DS1_OUT are delayed for the first cycle of the transfer. During subsequent cycles of that transfer, M_DS0_OUT and M_DS1_OUT are non-delayed. The imposed delay is removed for the second and subsequent transfers, resulting in increased throughput during BLT and MBLT transfers. This optimization is explained in further detail below.

Gate 121 shown in FIG. 6 ANDs the MASTER_BE, WRITE, and LATCH_EN signals. The output of gate 121 is joined to the D terminal of flip-flop 122. Flip-flop 122 controls whether or not M_DS1_OUT and M_DS1_OUT are delayed when byte swap control circuit 120 is mastering on VMEbus 58. The output of flip-flop 122 controls multiplexor 124, which selects either the delayed or the non-delayed versions of data strobe M_DS0 and M_DS1. If flip-flop 122 is set, the delayed versions of M_DS0 and M_DS1 are output as M_DS0_OUT and M_DS1_OUT. If flip-flop 122 is cleared, the non-delayed versions of M_DS0 and M_DS1 are output as M_DS0_OUT and M_DS1_OUT.

For flip-flop 122, if byte swap control circuit 120 is mastering on VMEbus 58 during the current bus cycle, and if the MASTER_BE bit is set, and the cycle is a write cycle, the output of flip-flop 122 will be set. Further, if the bit is set as part of the first cycle of a BLT or an MBLT, the bit will be cleared on the second and subsequent cycles of the BLT/MBLT since LATCH_EN will be cleared.

Gate 123 ORs the M_DS0 and M_DS1 signals and inverts the output. The inverted output of gate 123 is joined to the EN terminal of flip-flop 122.

Multiplexer 124 should be understood to include two 1×2 multiplexers operating under common control. The M_DS0 and M_DS1 signals are connected to selectable terminals 0 of multiplexer 124. The M_DS0 signal is connected to delay circuit 125a, and the M_DS1 signal is connected to delay circuit 125b. Conventional IC chips for delaying digital signals are suitable and are readily available. The outputs of delay circuits 125a and 125b are connected to selectable terminals 1 of multiplexer 124. Multiplexer 124 is controlled by the output of flip-flop 122 which is connected to the S terminals of multiplexer 124. The common terminals of multiplexer 124 are connected to control signals M_DS0_OUT and M_DS1_OUT.

Thus, multiplexer 124 can connect either selectable terminal 0 (the non-delayed data strobe signals) or selectable terminal 1 (the delayed data strobe signals), according to the input received on terminal S. In this manner, byte swap control circuit 120 can selectively assert a delayed or non-delayed data strobe signal to VMEbus 58.

Gates 121 and 123, latch 122, and the MASTER_BE, WRITE, and LATCH_EN signals provide means for detecting the execution of a byte swapping operation in master mode. Multiplexer 124 provides means for generating a second, delayed data strobe signal in master mode. Delay circuits 125a–125d provide means for delaying the assertion of the second data strobe signal while the byte-swapping operation executes.

Figure 7:
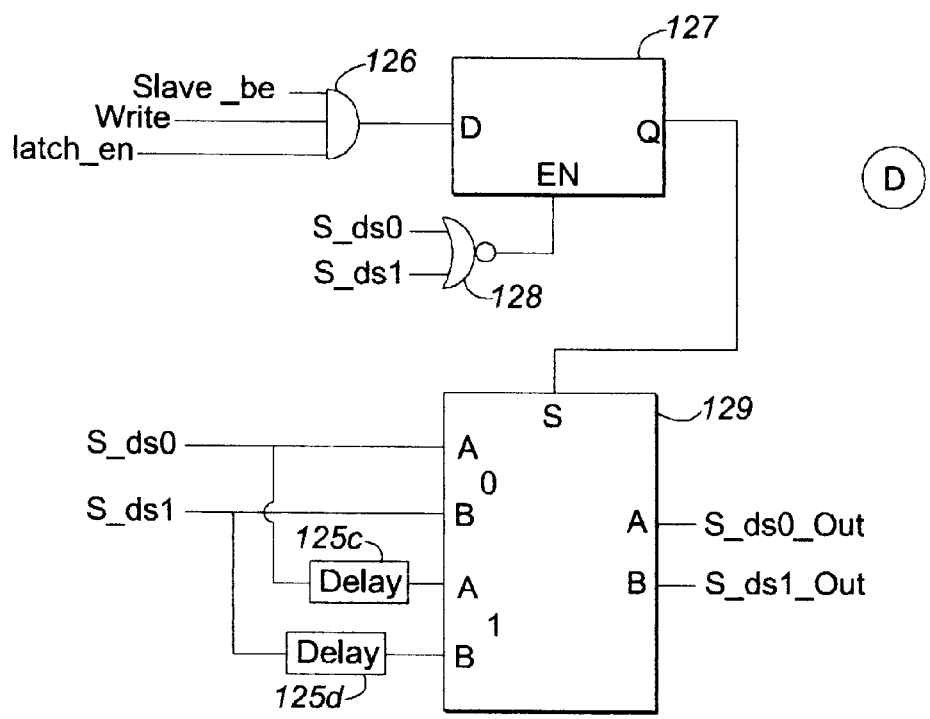
FIG. 7 is a schematic diagram of the circuit defining the data strobe signals when the PCI bus is in slave mode.

FIG. 7 is a schematic diagram of the logic in byte swap control circuit 120 that defines the S_DS0_OUT and the S_DS1 OUT signals, which are versions of the S_DS0 and S_DS1 data strobe signals taken as input. The circuit in FIG. 7 is enabled when byte swap control circuit 120 is a slave on VMEbus 58, Byte swap control circuit 120 can produce S_DS0_OUT and S_DS1_OUT signals that are either delayed or non-delayed relative to the S_DS0 and S_DS1 data strobe signals. During single cycle transfers (those cycles that are neither block transfer cycles nor multiplexed block transfer cycles), the S_DS0_OUT and S_DS1_OUT data strobes are always delayed relative to the input S_DS0 and S_DS1 data strobes.

For BLT and MBLT operations, S_DS0_OUT and S_DS1_OUT are delayed for the first cycle of the transfer, During subsequent cycles of that transfer, S_DS0_OUT and S_DS 1OUT are non-delayed. The imposed delay is removed for the second and subsequent transfers, resulting in increased throughput during BLT and MBLT transfers. This optimization is explained in further detail below.

Gate 126 shown in FIG. 7 ANDs the SLAVE_BE, WRITE, and LATCH_EN signals. The output of gate 126 is joined to the D terminal of flip-flop 127. Flip-flop 127 controls whether or not S_DS0_OUT and S_DS1_OUT are delayed when byte swap control circuit 120 is a slave on VMEbus 58. Gate 128 ORs the S_DS0 and S_DS1 signals and inverts the output. The inverted output of gate 128 is joined to the EN terminal of flip-flop 127.

The output of flip-flop 127 controls multiplexor 129, which selects either the delayed or the non-delayed versions of S_DS0 and S_DS1. If flip-flop 127 is set, the delayed version of S_DS0 and S_DS1 are output as S_DS0_OUT and S_DS1 _OUT. If flip-flop 127 is clear, the non-delayed version of S_DS0 and S_DS1 are ouput as S_DS0_OUT and S_DS1_OUT. For flip-flop 129, if the cycle is a slave cycle, and the SLAVE_BE bit is set, and the cycle is a write-cycle, the output will be set. Further, if the bit is set as part of the first cycle of a BLT or MBLT, the bit will be cleared on the second and subsequent cycles of the BLT/MBLT since LATCH_EN will be cleared.

Multiplexer 129 should be understood to include two 1×2 multiplexers operating under common control. The S_DS0 and S_DS1 signals are connected to selectable terminals 0 of multiplexer 124. The S_DS0 signal is connected to delay circuit 125c, and the S_DS1 signal is connected to delay circuit 125d. The outputs of delay circuits 125c and 125d are connected to selectable terminals 1 of multiplexer 129 Multiplexer 129 is controlled by the output of flip-flop 127 which is connected to the S terminals of multiplexer 129. The common terminals of multiplexer 129 are connected to control signals S_DS0_OUT and S_DS1 OUT.

Thus, multiplexer 129 can connect either selectable terminal 0 (the non-delayed data strobe signals) or selectable terminal 1 (the delayed data strobe signals), according to the input received on terminal S. In this manner, byte swap control circuit 120 can selectively assert a delayed or non-delayed data strobe signal to PCI bus 52.

Gates 126 and 128, latch 127, and the SLAVE_BE, WRITE, LATCH_EN signals provide means for detecting the execution of a byte swapping operation in slave mode. Multiplexer 129 provides means for generating a second, delayed data strobe signal in the slave mode.

Figure 8:
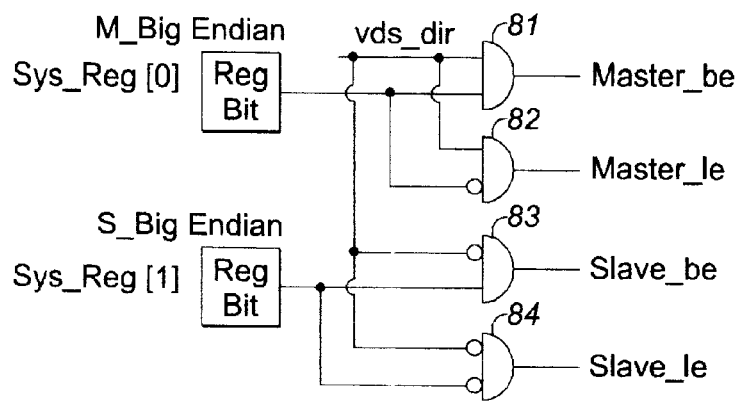
FIG. 8 is a schematic diagram of the circuit defining the MASTER_BE, MASTER_LE, SLAVE_BE, and SLAVE_LE control signals.

FIG. 8 is a schematic diagram of the logic defining the MASTER_BE, MASTER_LE, SLAVE_BE, and SLAVE_LE control signals used by byte swap control circuit 120. These control signals are derived from the SYS_REG[0] and SYS_REG[1] bits and the signal VDS_DIR driven by adapter chip 110. VDS_DIR is a 1 when adapter chip 110 is the VMEbus master, and VDS_DIR is 0 when adapter chip 110 is the VMEbus slave.

Gate 81 produces MASTER_BE by ANDing VDS_DIR with SYS_REG[0]. Gate 82 produces MASTER_LE by ANDing VDS_DIR with SYS_$_{I\ REG}$[0]*. Gate 83 produces SLAVE_BE by ANDing VDS_DIR* with SYS_REG[ 1]. Gate 84 produces SLAVE_LE by ANDing VDS_DIR* with SYS_REG[1]*.

Figure 9:
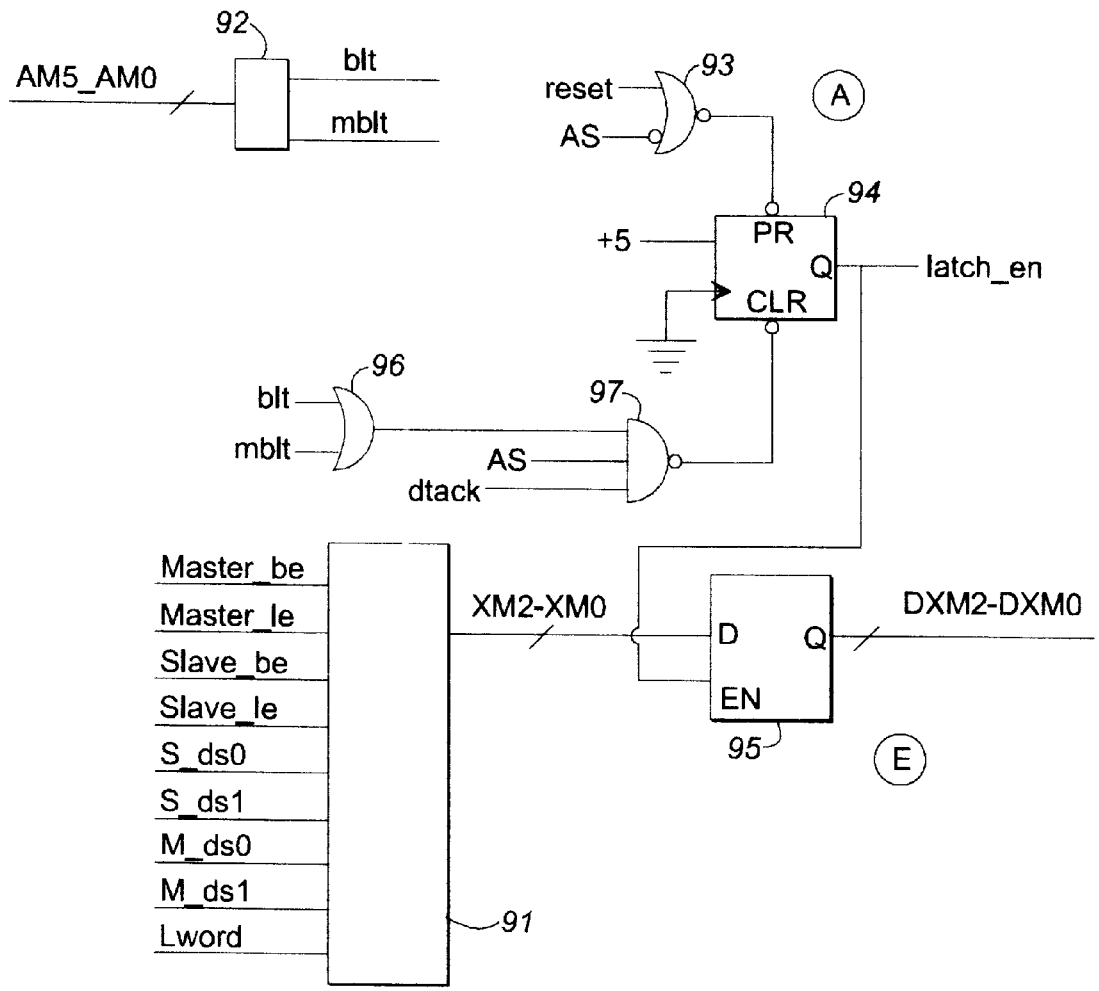
FIG. 9 is a schematic diagram of the circuit defining the LATCH_EN and DXM2–DXM0 control signals.

FIG. 9 is a schematic diagram of the logic defining the LATCH_EN and DXM2–DXM0 control signals used by byte swap control circuit 120. After a power-on reset LATCH_EN is set to a 1 (active since the signal is used as active high). When LATCH_EN is set, the multiplexer signals DXM2–DXM0 flow through latch 95 to data bus swap block 130.

If the current VMEbus cycle is a BLT or an MBLT cycle as determined by decoder 92, the LATCH_EN signal will be cleared when DTACK is asserted for the cycle. Subsequent cycles during the BLT or MBLT transfer will have LATCH_EN cleared. LATCH_EN cleared and staying cleared during the BLT or MBLT transfer "latches" the multiplex signals DXM2–DXM0 output to data bus swap block 130 for the remaining cycles of the BLT or MBLT, holding DXM2–DXM0 constant during the remainder of the BLT or MBLT cycle.

Block 91 derives the DXM2, DXM1, and DXM0 signals from the MASTER_BE, MASTER_LE, SLAVE_BE, SLAVE_LE, S_DS0, S_DS1, M_DS0, M$_{13}$ DS1, and LWORD signals according to the following logic equations, with "&" representing a logical AND, "#"representing a logical OR, and "!" representing a logical NOT:

```
DXM2 =    MASTER_BE & !M_DS1 & !M_DS0 & !LWORD#
          SLAVE_BE & !S_DS1 & !S_DS0 & !LWORD;
DXM1 =    MASTER_BE & !M_DS1 & !M_DS0 & LWORD#
          SLAVE_BE & !S_DS1 & !S_DS0 & LWORD#
          !SYS_REG[1];
DXM0 =    MASTER_BE & !M_DS1 & M_DS0 & !LWORD#
          MASTER_BE & !M_DS1 & M_DS0 & LWORD#
          MASTER_BE & M_DS1 & !M_DS0 & !LWORD#
          MASTER_BE & M_DS1 & !M_DS0 & LWORD#
          MASTER_BE & M_DS1 & M_DS0#
          SLAVE_BE & !S_DS1 & S_DS0N & !LWORD#
          SLAVE_BE & !S_DS1 & S_DS0 & LWORD#
          SLAVE_BE & S_DS1 & !S_DS0 & !LWORD#
          SLAVE_BE & S_DS1 & !S_DS0 & LWORD#
          SLAVE_BE & S_DSIN & S_DS0#
          MASTER_LE#
          SLAVE_LE;
```

The DXM2–DXM0 signals are routed from gate 91 to three-bit latch 95, which is controlled by the LATCH_EN signal.

The LATCH_EN signal is derived as follows. Gate 92 derives the MBLT and BLT signals from AM5–AM0, which are the six Address Modifier lines defined by the VMEbus specification. Gate 96 ORs the MBLT and BLT signals and routes the output to gate 97. Gate 97 ANDs the output of gate 96 with AS and DTACK and inverts the output. The inverted output of gate 97 is routed to the CLR terminal of flip-flop 94. Gate 93 ORs the RESET signal and the inverted AS signal, and inverts the output. The inverted output of gate 93 is routed to the PR terminal of flip-flop 94. The output of flip-flop 94 is the LATCH_EN signal, which is then routed to the EN terminal of latch 95. When LATCH_EN is high, DXM2–DXM0 flow through latch 95.

Gates 93 and 96, and decoder 92 provide means for detecting the execution of a block transfer. Block 91 provides means for generating the plurality of signals controlling data bus swap circuit 130. Flip-flop 94, latch 95, the DTACK signal, and gate 97 provide means for maintaining the byte swap control signals (DXM2–DXM0) constant during the execution of the block transfer.

Figure 10:
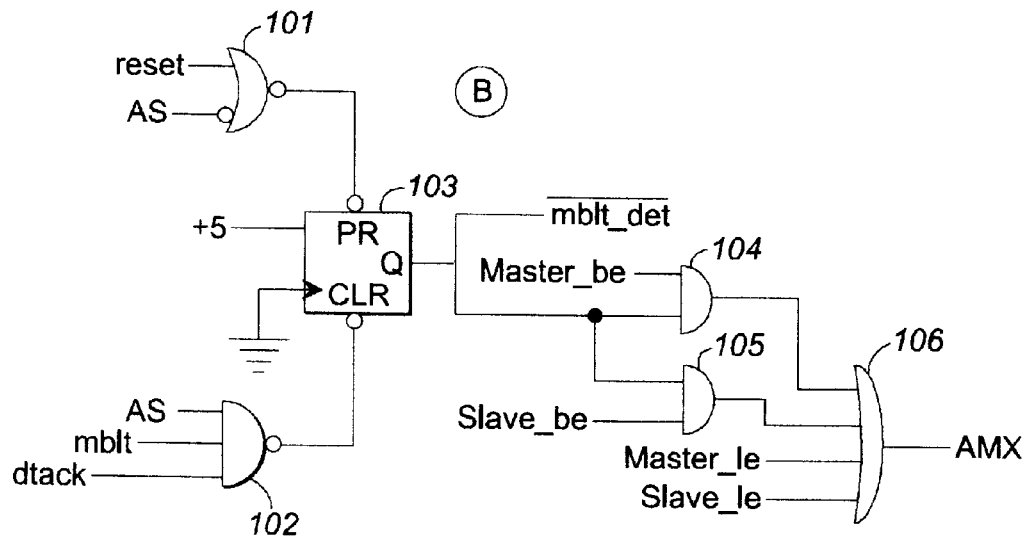
FIG. 10 is a schematic diagram of the circuit defining the AXM and MBLT_DET control signals.

FIG. 10 is a schematic diagram of the logic that defines the AXM control signal. The AXM signal is used to control address bus swap circuit 160 and is produced by circuitry that detects an MBLT transfer. During BLT and single-transfer cycles, the AXM output is always set, since during these cycles address buses 50 and 50a carry only address information. However, during an MBLT, address buses 50 and 50a carry data during the second cycle and all subsequent cycles. Thus, address bus 50 and 50a must be byte-swapped to ensure endian compatibility between PCI bus 52 and VMEbus 58, and byte swap control circuit 120 must define a signal to control address bus swap circuit 160. This control signal is AXM.

Flip-flop 104 output MBLT_DET* is always a 1 for single-cycle and BLT transfers.

MBLT_DET* is cleared when DTACK is asserted for the first cycle of an MBLT transfer. If the endian mode has been preset as big_endian, then AXM will be cleared and remain cleared during the second and subsequent cycles of the MBLT. If AXM is cleared, then address bus swap circuit 160 will swap the bytes on address buses 50 and 50a.

Gate 101 ORs the RESET signal with the inverted AS signal and inverts the output, which is then routed to the PR terminal of flip-flop 103. Gate 102 ANDs the AS signal, the MBLT signal derived in FIG. 9, and the DTACK signal and inverts the output, which is then routed to the CLR terminal of flip-flop 103. The output of flip-flop 103 is the MBLT_DET* signal, which is routed to gates 104 and 105. Gate 104 ANDs the MBLT_DET* signal with the MASTER_BE signal. Gate 105 ANDs the MBLT_DET* signal with the SLAVE_BE signal. Finally, gate 106 ORs the outputs of gates 104 and 105 with MASTER_LE and SLAVE_LE to produce AXM.

Figure 11:
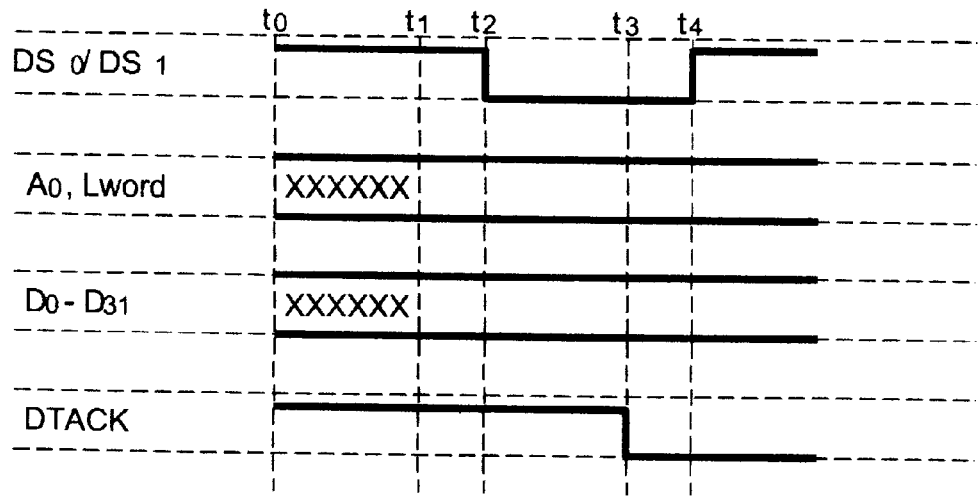
FIG. 11 is a timing diagram of a typical VMEbus write cycle.

FIG. 11 is a timing diagram of a typical write cycle with PCI bus 52 being in master mode and with VME bus 58 being in slave mode. At t0, adapter chip 110 drives control signals DS0/DS1, A01, and LWORD and data bus D0–D31. From t0 to t1, the A0, LWORD, and D0–D31 signals are unstable, but by t1, those signals become stable. At t2, adapter chip 110 asserts DS0/DS1 low to signify that A0, LWORD, and D0–D31 are stable and readable by VME bus 58. While DS0/DS1 are driven low, the VMEbus timing specification prohibits any device from altering the contents of D0–D31 . At t3, after VME bus 58 latches the contents of D0–D31 , it drives the DTACK signal low to acknowledge the receipt of D0–D31 . At t4, PCI bus 52 allows DS0/DS1 to go high to indicate that the bus is no longer stable and is ready for the next bus cycle.

Figure 12:
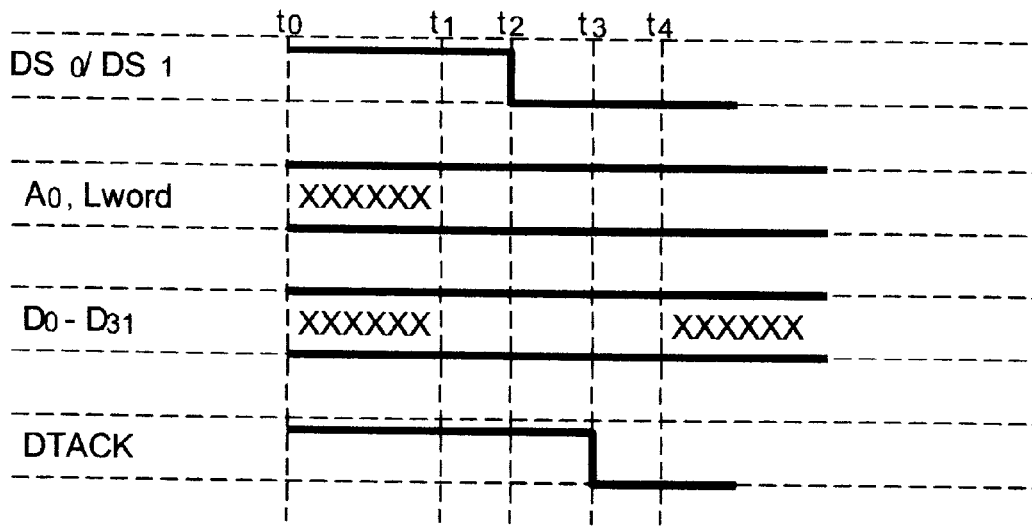
FIG. 12 is a timing diagram of the VMEbus write cycle as shown in FIG. 11, but with byte swapping added.

FIG. 12 is a timing diagram of the same typical write cycle shown in FIG. 11, but FIG. 12 also illustrates the timing of the byte swapping operation. Up until time t2, FIG. 12 is the same as FIG. 11. At time t2, adapter chip 110 asserts DS0/DS1 low to signify that D0–D31 are stable. Thus, at any time after t2, the slave VME bus 58 should be able to access D0–D31 in full confidence that D0–D31 are stable. At t3, slave VME bus 58 drives DTACK low to acknowledge receipt of D0–D31 . However, at t3, the bytes on D0–D31 are in "little endian" order, because they were driven by master PCI bus 52 and subsequently by adapter chip 110. Thus, the bytes on D0–D31 must be swapped to "big endian" order before they can be transferred to VME bus 58. Sometime after t2, at t4, byte swapping circuit 130 begins swapping D0–D31 into "big endian" order for compatibility with slave VME bus 58. However, in swapping D0–D31 , byte swapping circuit 130 necessarily de-stabilizes D0–D31 while DS0/DS1 remain asserted, thus violating the VMEbus timing specification.

Figure 13:
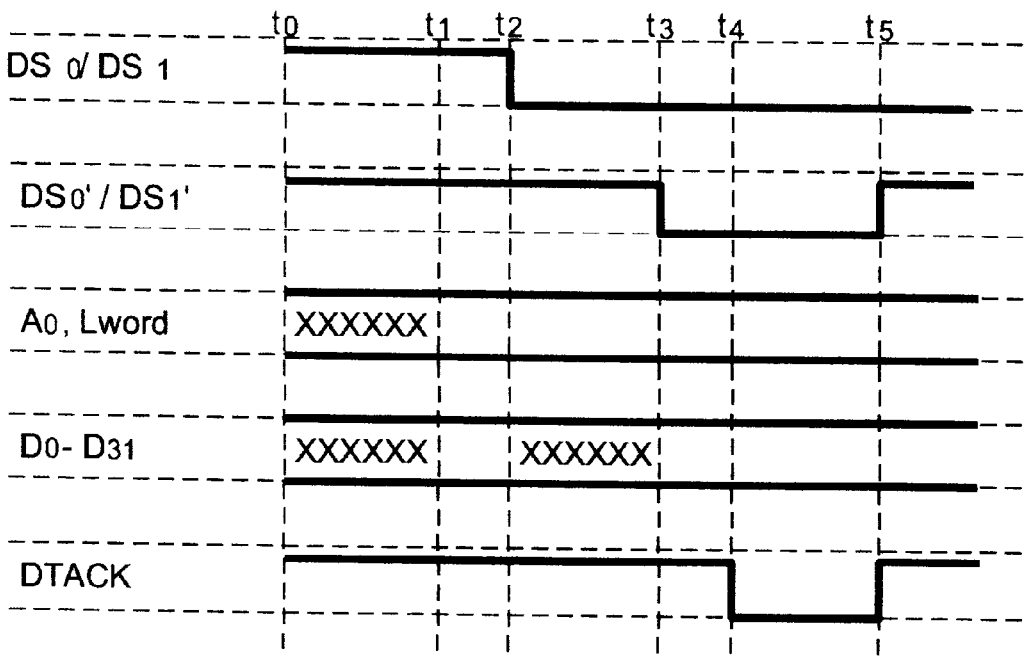
FIG. 13 is a timing diagram of the VMEbus write cycle as shown in FIG. 12, but with data bus stabilization signals being delayed until byte swapping is completed.

FIG. 13 is a timing diagram of a solution to the VMEbus timing violation illustrated in FIG. 12.

The problem illustrated in FIG. 12 is that DS0/DS1 are asserted by adapter chip 110 before byte swapping circuit 130 can swap D0–D31 . The solution illustrated in FIG. 13 includes control signals DS0' and DS 1', which are essentially delayed versions of the DS0/DS1 signals illustrated in FIGS. 11 and 12. In FIG. 13, DS0/DS1 are driven low at t2 by adapter chip 110, signaling byte swapping circuit 130 that D0–D31 contain stable data in "little endian" order. After t2, byte swapping circuit 130 begins swapping D0–D31 appropriately and completes swapping at t3. Shortly after t3, VME control interface 120 asserts DS0'/DS1' low, indicating that byte swapping circuit 130 has finished swapping D0–D31 into "big endian" order and that the bytes on data bus D31–D0 are stable. VME control interface 120 sends DS0'/DS1' to the slave VME bus 58, thus indicating that D0–D31 are swapped and stable. At t4, slave VME bus 58 drives DTACK low, indicating that VME bus 58 has acknowledged the data on D0–D31 . At t5, VME control interface 120 releases DS0'/DS1', readying interface circuit 10 for the next bus cycle.

As illustrated in FIG. 13, VME control interface 120 receives the DS0'/DS1' signals driven by adapter chip 110, waits for byte swapping circuit 130 to finish swapping D0–D31 , and thereafter drives a "delayed" set of DS0'/DS1' signals to the VME bus 58. VME control interface 120 avoids violating the VME bus timing specification by asserting DS0/DS1 to VME bus 58 after byte swapping circuit 130 has finished swapping D0–D31 . The circuitry comprising VME control interface 120 will be described in more detail below.

FIGS. 11–13 illustrate a typical VMEbus write cycle. However, the same concepts and principles shown in those figures apply equally to VMEbus read cycles as defined in the VMEbus specification. On a read cycle, the slave drives DTACK low to indicate that it has placed data on the data bus. Thus, DTACK serves as a type of data strobe on read cycles, similar to DS0/DS1 shown in FIGS. 11–13.

Figure 14:
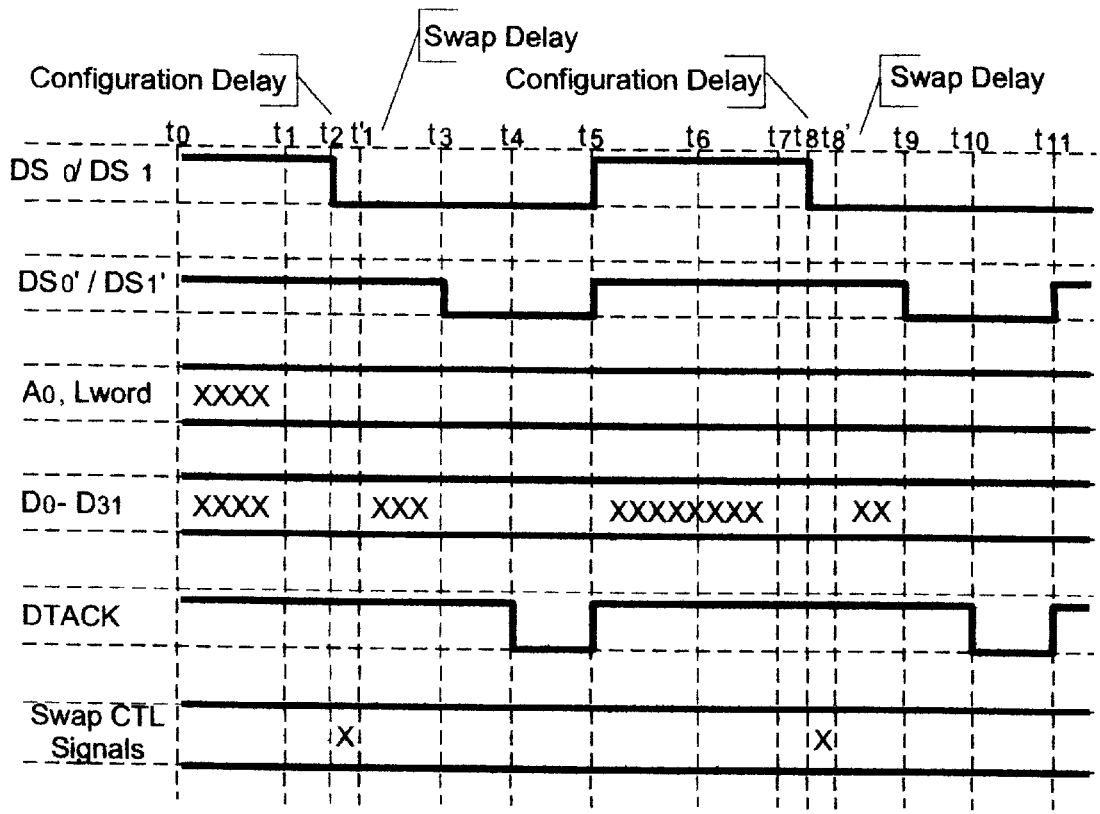
FIG. 14 is a timing diagram of two consecutive VMEbus write cycles executed during a VMEbus block transfer, illustrating the delays while the byte swapping circuit operates.

FIG. 14 illustrates an optimization that the invention provides during VMEbus block transfers. FIG. 14 is a timing diagram of two consecutive VME bus write cycles executed during a block transfer where the VME bus 58 is in slave mode. At t0, the first bus cycle begins, and the A0, LWORD, and D0–D31 signals are unstable. At t1, the A0, LWORD, and D0–D31 signals stabilize, and at t2, adapter chip 110 drives DS0/DS1 low to VME control interface 120. At t2, VME control interface 120 latches the AM5–AM0, VDS_DIR, WRITE, A0, LWORD, DS0, and DS1 signals, and begins configuring byte swapping circuit 130 appropriately. After a configuration delay from t2 to t2', byte swapping circuit 130 begins swapping D0–D31 , and A31–A1 and LWORD if an MBLT cycle is being executed. After a swapping delay from t2' to t3, byte swapping circuit 130 is finished swapping D0–D31 , and a short time afterwards, VME control interface 120 drives DS0'/DS1' low, indicating to VME bus 58 that D0–D31 are stable and swapped. At t4, slave VME bus 58 drives DTACK low, indicated that it has acknowledged D0–D31 . At t5, VME interface circuit 120 releases DS0'/DS1', readying itself for the next bus cycle.

At t6, the second write cycle begins, with D0–D31 being unstable. However, because the first and second write cycles illustrated in FIG. 14 are being executed as part of a block transfer, the A0, AM5–AM0, and LWORD signals do not change from the first write cycle to the second write cycle. At t7, D0–D31 stabilize, and at t8, adapter chip 110 drives DS0/DS1 low. At t8, VME control interface latches A0, LWORD, and DS0/DS1, and begins configuring byte swapping circuit 130 appropriately. After a configuration delay from t8 to t8', byte swapping circuit 130 begins swapping D0–D31 . After a swapping delay from t8' to t9, byte swapping circuit 130 is finished swapping D0–D31 , and a short time afterwards, VME control interface 120 drives DS0'/DS1' low, indicating that D0–D31 are stable and swapped. At t10, slave VME bus 58 drives DTACK low, indicated that it has acknowledged D0–D31 . At t11, VME interface circuit 120 releases DS0'/DS1', readying itself for the next bus cycle.

In FIG. 14, note that the first write cycle (t0 to t5) includes a configuration delay from t2 to t2' and a swapping delay from t2' to t3. Similarly, the second write cycle (t6 to t11) includes a configuration delay from t8 to t8' and a swapping delay from t8' to t9. The swapping delays in the first and second write cycles will typically remain constant from cycle to cycle. However, the configuration delays in the first and second write cycles need not remain constant, and this fact presents an opportunity to optimize interface circuit 10 for peak throughput during block transfers. This optimization is described below in connection with FIG. 15.

Figure 15:
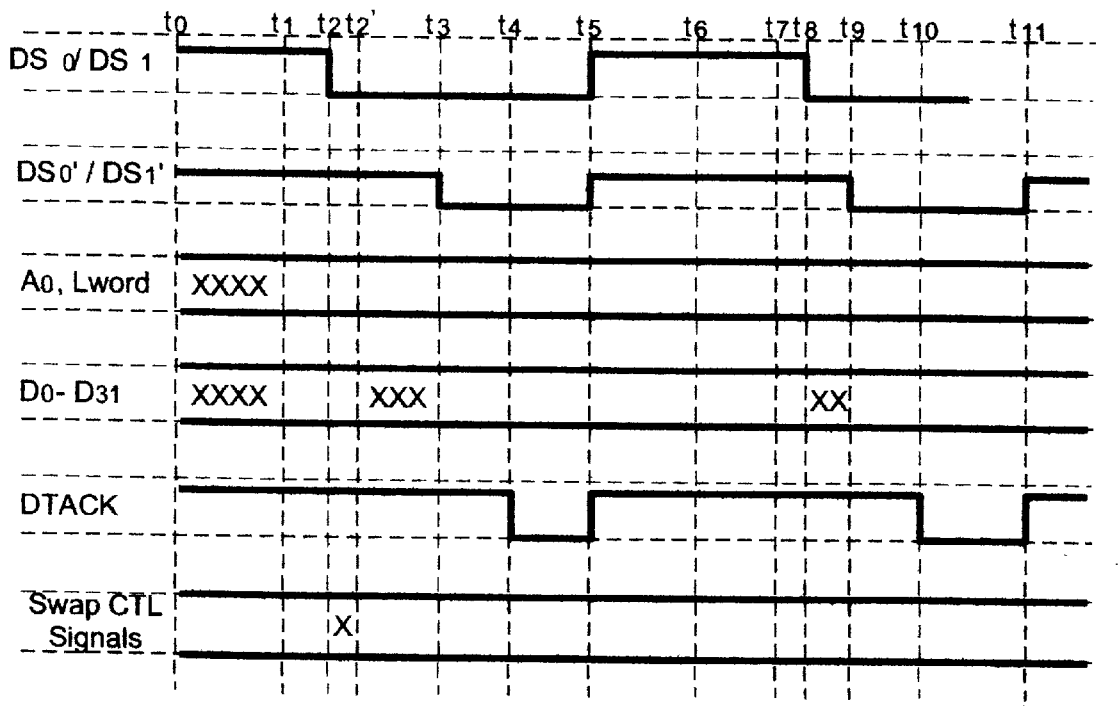
FIG. 15 is a timing diagram of the VMEbus block transfer as shown in FIG. 14, but illustrating the optimization of the invention.

FIG. 15 is a timing diagram of two consecutive write cycles executed during a block transfer. The first write cycle runs from t0 to t5, and the second write cycle runs from t6 to t11. The timing shown in FIG. 15 is similar to that illustrated in FIG. 14, but FIG. 15 also illustrates an optimization performed by the invention during block transfers. As explained above in connection with FIG. 14, the A0 and LWORD signals do not change from the first write cycle to the second write cycle. Thus, there is no need to re-configure byte swapping circuit 130 for the second write cycle, or for any succeeding write cycle. Thus, the first write cycle illustrated in FIG. 15 shows a first configuration delay from t2 to t2' and a first swapping delay from t2' to t3. However, the second write cycle shows only a second swapping delay from t8 to t9, with no second configuration delay. Contrast the second write cycle shown in FIG. 14, which second write cycle includes a second configuration delay from t8 to t8'. In FIG. 15, the invention completely eliminates that second configuration delay, thus cutting the cumulative delay inherent in interface circuit 10 and boosting circuit throughput accordingly.

For a concrete example of the impact of the optimization illustrated in FIG. 15, consider that the cumulative delay inherent in the circuit timing shown in FIG. 14 can be represented by equation (1):

$$\text{Delay} = (\text{configuration\_delay} + \text{swapping\_delay}) * \text{write\_cycles}. \quad (1)$$

The delay inherent in the circuit timing shown in FIG. 15 can be represented by equation (2):

$$\text{Delay} = (\text{configuration\_delay} + \text{swapping\_delay}) + (\text{swapping\_delay} * (\text{write\_cycles} - 1)). \quad (2)$$

Suppose that the configuration delay is 10 time units, that the swapping delay is 10 time units, and that the number of write cycles in a given block transfer is 30. For that given block transfer, equation (1) yields a cumulative delay of 600 time units, however, for that same block transfer, equation (2) yields a cumulative delay of only 310 time units. Although the numbers in this example are purely arbitrary, this example illustrates the substantial impact of applicant's optimization during block transfers.

It should be understood that the above description is made only by way of example, and is not intended to limit the scope of the invention. Certain modifications may be made to the invention without departing from the spirit of the invention, which is defined by the appended claims.

We claim:

1. A method of interfacing a first computer system employing a first byte-ordering scheme to a second computer system employing a second byte-ordering scheme, the method comprising the steps of:

(a) asserting a plurality of bytes ordered in the first byte-ordering scheme;

(b) asserting a first data strobe signal indicating that the bytes are stable;

(c) sensing for the execution of a block transfer;

(d) re-ordering the bytes into a second byte-ordering scheme;

(e) time delaying the assertion of a second data strobe while said re-ordering is conducted, wherein said time delay is reduced if the execution of a block transfer is sensed; and (f) asserting a second data strobe signal indicating that the bytes are stable after said time delay.

2. The method of claim 1, wherein the step of asserting a plurality of bytes of data includes driving a plurality of bytes onto a data bus.

3. The method of claim 1, wherein the step of asserting a first data strobe signal includes asserting the first data strobe signal after presenting the plurality of bytes.

4. The method of claim 1, wherein the step of re-ordering the bytes includes swapping the order of the bytes after asserting the first data strobe signal.

5. An apparatus for interfacing a first bus employing a first byte-ordering scheme to a second bus employing a second byte-ordering scheme, the first bus generating a first data strobe signal, the apparatus comprising:

(a) means for re-ordering the bytes from said first byte-ordering scheme to said second byte-ordering scheme, said re-ordering means being capable of a plurality of byte-ordering configurations;

(b) a first means for selecting one of said plurality of byte-ordering configurations that selects a byte-ordering configuration for each bus cycle executed;

(c) a second means for selecting one of said plurality of byte-ordering configurations that selects a byte-ordering configuration for only the first bus cycle executed such that the byte-ordering configuration remains constant for subsequent bus cycles;

(d) a means for enabling either the first selecting means or the second selecting means;

(e) means for generating a second data strobe signal; and (f) means, joined to said generating means, for delaying the assertion of the second data strobe signal, said generating means being operatively controlled by said enabling means to selectively activate said delaying means when said first selecting means is enabled.

6. The apparatus of claim 5, wherein said detecting means includes a latch being enabled by the first data strobe signal.

7. The apparatus of claim 5, wherein said generating means includes a multiplexer having a select terminal, at least two selectable terminals, and at least one common terminal, the select terminal being connected to said detecting means, one of the selectable terminals being connected to first data strobe signal, the other of the selectable terminals being connected to said delaying means, and the common terminal being connected to the second data strobe signal.

8. A method of improving the throughput of an interface connecting a first bus employing a first byte-ordering scheme to a second bus employing a second byte-ordering scheme, the method comprising the steps of:

(a) detecting the execution of a block transfer;

(b) decoding control signals from the first bus;

(c) configuring a byte-swapping circuit;

(d) maintaining the configuration of the byte-swapping circuit constant during and between the execution of bus cycles contained in the block transfer, and (e) thereby reducing the execution time of each bus cycle.

9. The method of claim 8, wherein the step of detecting the execution of a block transfer cycle includes detecting the beginning of the block transfer cycle.

10. The method of claim 8, wherein the step of decoding control signals includes decoding control signals that indicate the execution of a block transfer cycle.

11. The method of claim 8, wherein the step of detecting the execution of a block transfer includes the step of detecting the execution of a VMEbus block transfer cycle.

12. The method of claim 8, wherein the step of maintaining the configuration includes maintaining the configuration of the byte-swapping circuit during the entire duration of the block transfer cycle.

13. The method of claim 11, wherein the step of detecting the execution of a VMEbus block transfer cycle includes decoding the VMEbus address modifier lines.

14. An apparatus for optimizing the throughput of an interface connecting a first bus and a second bus through a byte-swapping circuit being controlled by a plurality of signals, the first bus supporting a block transfer mode, the apparatus comprising:

(a) means for detecting the execution of the block transfer on the first bus;

(b) means for generating the plurality of signals controlling the byte swapping circuit; and (c) means, joined to said detecting means and to said generating means, for maintaining the byte swapping control signals constant during and between each bus cycle of the block transfer when a block transfer is detected, thereby optimizing the throughput by eliminating the time delay associated with changing the byte swapping control signal between each bus cycle.

15. The apparatus of claim 14, wherein said detecting means includes a decoder and a flip-flop being controlled by the decoder.

16. The apparatus of claim 14, wherein said generating means includes a decoding block deriving the byte swap control signals from control signals driven by the first bus.

17. The apparatus of claim 14, wherein said detecting means includes a signal indicating when the first cycle of the block transfer is complete.

18. The apparatus of claim 17, wherein said maintaining means includes a latch being controlled by the signal indicating that the first block transfer cycle is complete.

* * * * *